(12) United States Patent
Jeong et al.

(10) Patent No.: US 8,095,547 B2
(45) Date of Patent: Jan. 10, 2012

(54) METHOD AND APPARATUS FOR DETECTING SPAM USER CREATED CONTENT

(75) Inventors: Ho Wook Jeong, Seoul (KR); Jae Ho Kang, Seoul (KR); Hyung Deok Kim, Seoul (KR)

(73) Assignee: Yahoo! Inc., Sunnyvale, CA (US)

( * ) Notice: Subject to any disclaimer, the term of this patent is extended or adjusted under 35 U.S.C. 154(b) by 561 days.

(21) Appl. No.: 11/966,388

(22) Filed: Dec. 28, 2007

(65) Prior Publication Data

US 2009/0089279 A1  Apr. 2, 2009

(30) Foreign Application Priority Data

Sep. 27, 2007  (KR) .......................... 10-2007-0097401

(51) Int. Cl.
  G06F 7/00 (2006.01)
  G06F 17/30 (2006.01)
(52) U.S. Cl. ........ 707/752; 705/26.1; 707/769; 709/207
(58) Field of Classification Search .................. None
  See application file for complete search history.

(56) References Cited

U.S. PATENT DOCUMENTS

| | | | |
|---|---|---|---|
| 6,460,050 B1* | 10/2002 | Pace et al. .............................. 1/1 |
| 2002/0120702 A1* | 8/2002 | Schiavone et al. ............ 709/207 |
| 2005/0120019 A1* | 6/2005 | Rigoutsos et al. ................ 707/6 |
| 2005/0223076 A1* | 10/2005 | Barrus et al. ................... 709/207 |
| 2007/0055642 A1* | 3/2007 | Kim et al. ........................... 707/1 |
| 2008/0077995 A1* | 3/2008 | Curnyn ............................ 726/27 |
| 2008/0301184 A1* | 12/2008 | Sussmeier et al. .......... 707/104.1 |
| 2009/0030994 A1* | 1/2009 | Usher ............................. 709/206 |

FOREIGN PATENT DOCUMENTS

KR  10-2004-0092707  11/2004
KR  10-2004-0103444  12/2004

OTHER PUBLICATIONS

Notice of Preliminary Rejection for Korean Patent Application No. 10-2007-97401, Sep. 9, 2009.
English translation of Notice of Preliminary Rejection for Korean Patent Application No. 10-2007-97401, Sep. 9, 2009.
English abstract of KR 10-2004-0092707, Nov. 4, 2004.

* cited by examiner

Primary Examiner — Khanh Pham
Assistant Examiner — Azam Cheema
(74) Attorney, Agent, or Firm — SNR Denton US LLP

(57) ABSTRACT

A method includes receiving user-created content, as well as at least one of a service identifier (ID) and a content category ID of the user-created content. At least one of a plurality of key information databases is selected based on at least one of the received service ID and the received content category ID. Second key information is extracted from the received user-created content. The selected key information database is searched to retrieve first key information related to the second key information. The user-created content may be classified as spam content based on the extracted second key information and/or the retrieved first key information. The user-created content is conditionally stored in a network accessible data store, available to users of the user-created content hosting site, based upon the classification.

25 Claims, 9 Drawing Sheets

METHOD AND APPARATUS FOR DETECTING SPAM USER CREATED CONTENT

TECHNICAL FIELD

The present invention generally relates to providing a method and apparatus for detecting spam user-created content (UCC).

BACKGROUND

The Internet has now become highly integrated into everyday life. Thus, the Internet has evolved from a simple file transferring medium to an interactive medium where its users create and share contents such as writings, music and video clips. Such content created by the Internet users are commonly referred to as "User Created Content (UCC)." Online portal sites, such as Yahoo and Naver, provide UCC service to their users. The Internet users may freely upload and register their UCC to the online portal site so that other Internet users may enjoy the registered UCC through the online portal site. However, similar to e-mails, UCC is often misused for commercial gain or other inappropriate purposes. These spam UCCs contain advertisement contents and are a nuisance for portal site operators. The portal site operators continually check the contents of the registered UCC and remove those determined as containing commercial, abusive or other inadequate contents. However, since the uploaded UCC are checked only after their registration, the UCC with inappropriate contents are exposed to other Internet users until they are manually inspected and deleted by the portal site operators. Further, a significant number of human operators are required to enforce such censorship, which leads to waste of valuable human resources. Therefore, there is a need for a method and apparatus for automatically detecting spam UCC prior to registration on portal site or other content hosting servers.

SUMMARY

The present invention provides methods, apparatuses and systems directed to automatically detecting spam user created content prior to registration on a portal site or other content hosting server. In a particular implementation, there is provided a method for processing spam contents, which comprises: maintaining a plurality of key information databases; receiving user-created content and at least one of a service identifier (ID) and a content category ID from one or more users of a user-created content hosting site; selecting one of the plurality of key information databases based on at least one of the service ID and the content category ID; extracting second key information from the received user-created content; searching the selected key information database to retrieve first key information related to the second key information; classifying the received user-created content as spam content based on the extracted second key information and/or the first key information related to the second key information; and conditionally storing the user-created content in a network accessible data store available to users of the user-created content hosting site based on classifying the user-created content as spam or non-spam content. Said first and second key information may comprise at least one of predetermined type(s) of data, word(s) and phrase(s) in said contents, wherein said data comprises a user ID, a universal resource locator, a site address, an account number and/or a telephone number. In addition, said method may further comprise: determining whether the extracted second key information corresponds to predefined restricted information; and if the extracted second key information corresponds to the predefined restricted information, removing the extracted second key information and/or replacing the extracted second key information with predefined different information.

DESCRIPTION OF EXAMPLE EMBODIMENT(S)

In the following, various embodiments of the present invention will be described in detail with reference to the accompanying drawings. It will be apparent, however, that these embodiments may be practiced without some or all of these specific details. In other instances, well known process steps or elements have not been described in detail so as not to obscure the description of the invention.

Figure 1:
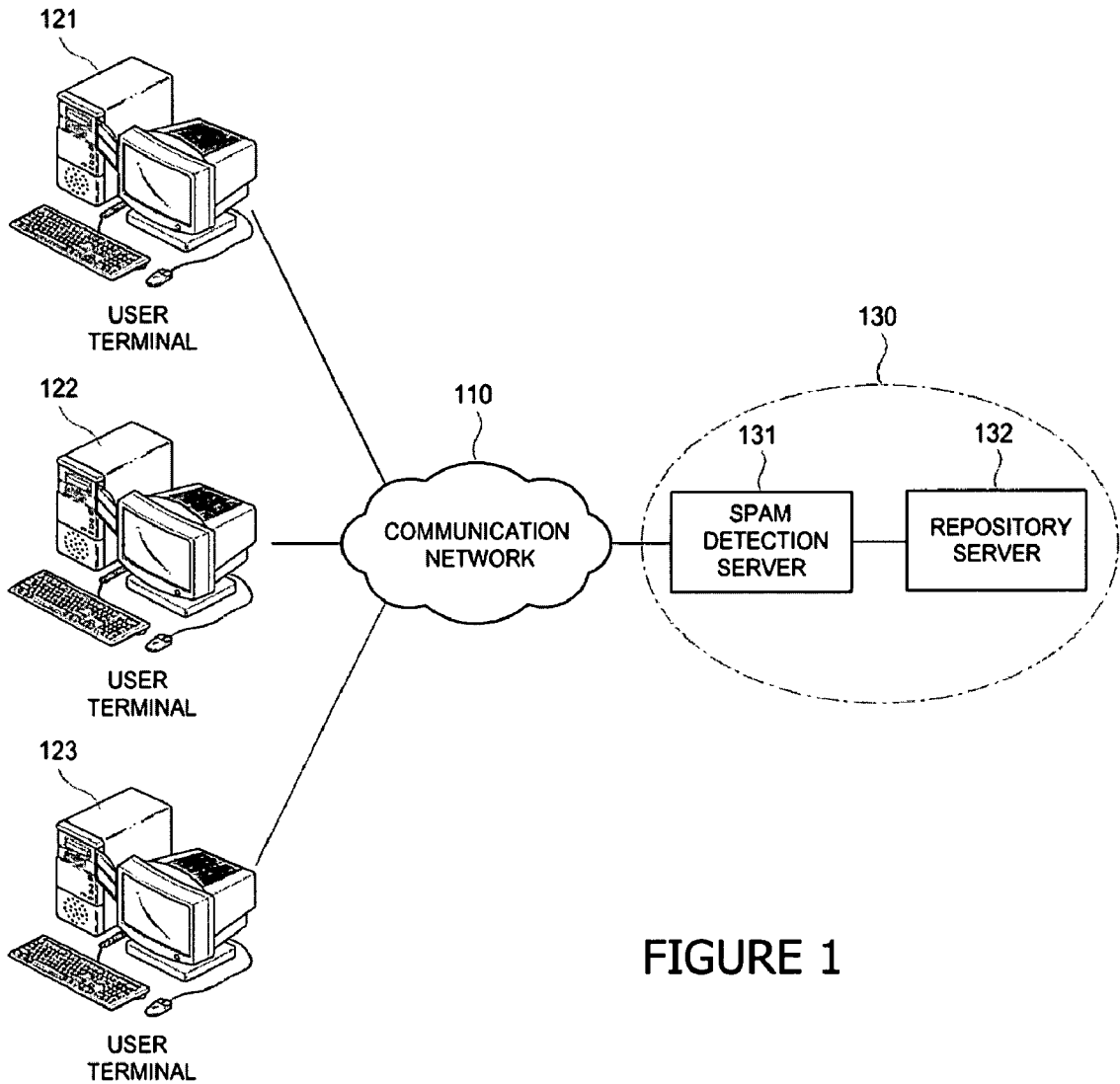
FIG. 1 illustrates a schematic diagram of an online spam detection system according to one embodiment of the present invention.

FIG. 1 illustrates a schematic diagram of an online spam detection system according to one embodiment of the present invention. Referring to FIG. 1, the online spam detection system 100 includes a communication network 110 such as the Internet, a plurality of user terminals (UT) 121, 122 and 123 connected to the communication network 110 and a portal site system 130 providing online web service, such as user created contents (UCC) service to the user terminals 121, 122 and 123 through the communication network 110. Herein, the UCC service is defined as a service that allows a plurality of users to download from the portal site system 130 UCC uploaded and registered thereto by other users, e.g., through the user terminals 121, 122 and 123. Contrary to the e-mails, which may be only accessed by the sender or the recipient(s) of the corresponding email, the UCC is a public content item that may be freely accessed by any users having access to the portal site system.

In one embodiment, the portal site system 130 may provide a plurality of UCC services each directed toward different types of contents. Examples of the UCC services may include a blog UCC service, a bulletin UCC service, a café UCC service, a picture UCC service, a movie UCC service, etc.

Each UCC service may be identified by a service identifier (ID), such as the universal resource locator (URL) (or a portion of the URL) assigned to the corresponding UCC service. For example, all the URLs of the blog websites provided by the portal service system 130 may include the term "blog.yahoo.com."

Further, the portal site system 130 may require the users to select the UCC before its' uploading at least one of a plurality of content categories provided by the portal site system 130. The content category serves as indicia for the type of the content contained in the corresponding UCC. For example, the portal site system 130 may provide a news blog UCC service that provides news UCCs created by the owner of the blog. In this example, the portal site system 130 may require the owner of the blog to select one of a plurality of content categories, such as politics and sports. Each of the content categories may be identified by using a content category identifier (ID).

The user terminals 121, 122 and 123 may be personal computers, notebooks or any other terminals with appropriate communication means to provide access to online UCC services. Although only three terminals 121, 122 and 123 are illustrated in FIG. 1 for ease of explanation, it should be noted that fewer or more than three terminals may be connected to the communication network 110 to access the portal site system 130.

For example, first, second and third users may respectively log on to the portal site system 130 through the first, second and third user terminals 121, 122 and 123 to upload UCC to the portal site system 130 through the communication network 110. In one embodiment, the users may choose one of a plurality of UCC services provided by the portal site system 130 to upload UCC to the portal site system 130. For example, the first user may upload a news UCC through the news blog UCC service provided by the portal site system 130. After the users log on to the portal site system 130, each of the user terminals 121, 122 and 123 may transmit their UCC to the portal site system 130 and request for their registration thereto. Once registered, the uploaded UCC may be freely accessed by other network entities connected to the portal site system 130 through the communication network 110 (e.g., user terminals 121, 122 and 123). Thus, there is a need to filter out spam UCC containing commercial, obscene or other inappropriate contents. To this end, the portal site system 130 is configured to perform spam detection of the uploaded UCC prior to their registration thereto.

In one embodiment, the portal site system 130 may include a spam detection server 131 for determining whether UCC transmitted from the user terminals 121, 122 and 123 is spam or not and a repository server 132 for storing UCC determined by the spam detection server 131 as non-spam content. The spam detection server 131 receives the UCC transmitted from the user terminals 121, 122 and 123, determines whether the received UCC is spam and only forwards those determined as non-spam to the repository server 132 for registration. In one embodiment, the spam detection server 131 may include a plurality of databases for UCC classification purposes and, in classifying the received UCC as spam or non-spam, may chose one of the databases based on the UCC service through which the received UCC was uploaded and the content category ID transmitted together with the received UCC. For example, if UCC with a content category of "politics" was received through a news blog service, then the spam detection server 131 may use a database designated for the news on politics in classifying the received UCC. The spam detection server 131 may delete the received UCC determined as spam and/or transmit a warning message to the terminal that sent the spam UCC. The repository server 132 receives and stores therein the UCC classified as non-spam by the spam detection server 131. The UCC stored in the repository server 132 may be freely accessed by the network entities connected to the communication network 110.

Figure 2:
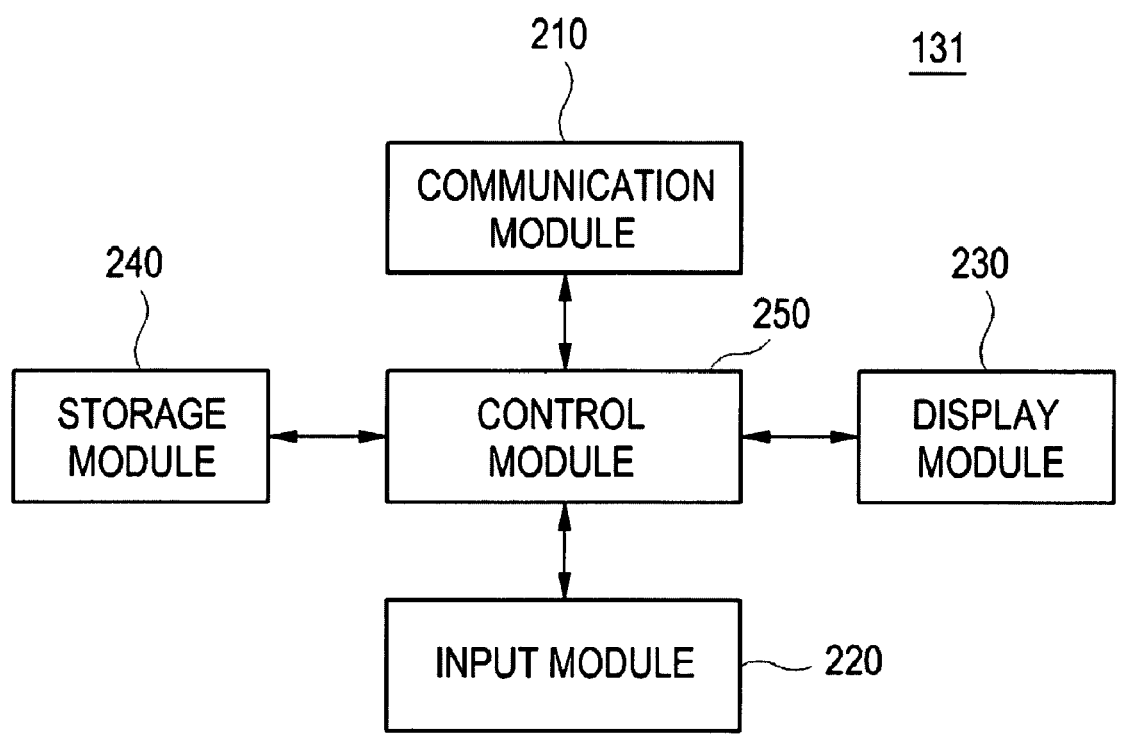
FIG. 2 illustrates a detailed block diagram of the spam detection server according to one embodiment of the present invention.

FIG. 2 illustrates a detailed block diagram of the spam detection server according to one embodiment of the present invention. Referring to FIG. 2, the spam detection server 131 may include: a communication module 210 for communicating with the repository server 132 or other network entities connected to the spam detection server 131 or the communication network 110.

Further, the spam detection server may include: an input module 220 for receiving key inputs from portal site operators; a display module 230 for displaying visual images; a storage module 240 for storing information and data required for spam detection; and a control module 250 for controlling the overall operation, especially the storage, communication and processing of UCC received from the network entities connected through the communication network 110.

The control module 250 may receive UCC registration requests containing UCC from one of the user terminals 121, 122 and 123 through the communicating part 210. In one embodiment, the UCC registration request may further include a service ID and a content category ID for the received UCC. When the control module 250 receives the UCC registration request, the control module 250 may extract key information from the received UCC and retrieve the information relevant to the extracted key information from key information DB stored in the storage module 240 to determine whether the received UCC is spam content using at least one of the predetermined classification algorithms.

The key information may comprise one to many data types (e.g., word, phrase, user ID, universal resource locator (URL), site address, account number, telephone number, social-security number, etc.) or other features in UCC, which may serve as indicia of the nature of the UCC. For example, UCC created for advertising a gambling site may contain a URL or a site address including words related to gambling, such as www.poker.com and www.blackjack.com. Further, UCC with adult content may contain words related to sex or telephone numbers for providing phone-sex services. In addition, certain user IDs may be used by an advertiser to spread spam UCC. The key information may be extracted from UCC to classify it as spam or non-spam. Various extraction algorithms may be employed to extract key information from UCC.

The key information DB is a database containing a plurality of key information selected by the portal site operator and/or extracted from a pool of training data (i.e., a plurality of UCC classified as spam or non-spam). The training data pool may consist of UCC selected and pre-classified as spam or non-spam by the portal site operator. Further, the key information DB or the training data pool may be updated by the control module 250 based on newly received and classified UCC. For example, if new key information not included in the existing key information DB is extracted from the received UCC, then the key information DB may be updated to add the new key information. In addition to the key information, the key information DB may include classification algorithm data, which are required for processing the classification algorithm by the control module 250. The type and number of classification algorithm data required for each of the key information depends on the classification algorithm employed by the control module 250.

The classification algorithm is an algorithm that classifies an input object (e.g., UCC) into at least one of a plurality of classes (e.g., spam and non-spam) based on the information extracted from the contents of the input object (e.g., key information) and the information in a pre-stored information DB (e.g., key information DB). Examples of the classification algorithm include exact matching algorithm and document classification algorithms such as naïve-Bayes classifier algorithm, nearest neighbor algorithm, support vector machines, etc.

Further to classifying the received UCC, the control module 250 may check whether the received UCC contain any predetermined restricted contents, which may be stored in the storage module 240 as a restricted information DB, and delete the restricted contents from the UCC or replace it with predetermined contents. Laws and/or regulations may prohibit certain contents from being included in UCC. For example, the Korean Ministry of Information and Communication (MIC) does not allow UCC to include a residential number due to privacy issues. The control module 250 may prevent such restricted contents from being exposed to the public by deleting the contents from UCC prior to registration.

In one embodiment, the storage module 240 may store a plurality of key information DBs and/or a plurality of restricted information DB. Each of the above DBs may contain information directed toward a specific UCC service and/or a specific content category. In this embodiment, the control module 250, in classifying the received UCC, may determine one of the stored key information DBs to be used by the classification algorithm(s) based on the service ID and/or the content category ID of the received UCC. Further, the control module 250, in checking whether the received UCC contain any restricted contents, may choose one of the stored restricted information DBs based on the service ID and/or the content category ID of the received UCC. As mentioned above, the above IDs may be contained in the received UCC registration request.

Figure 3:
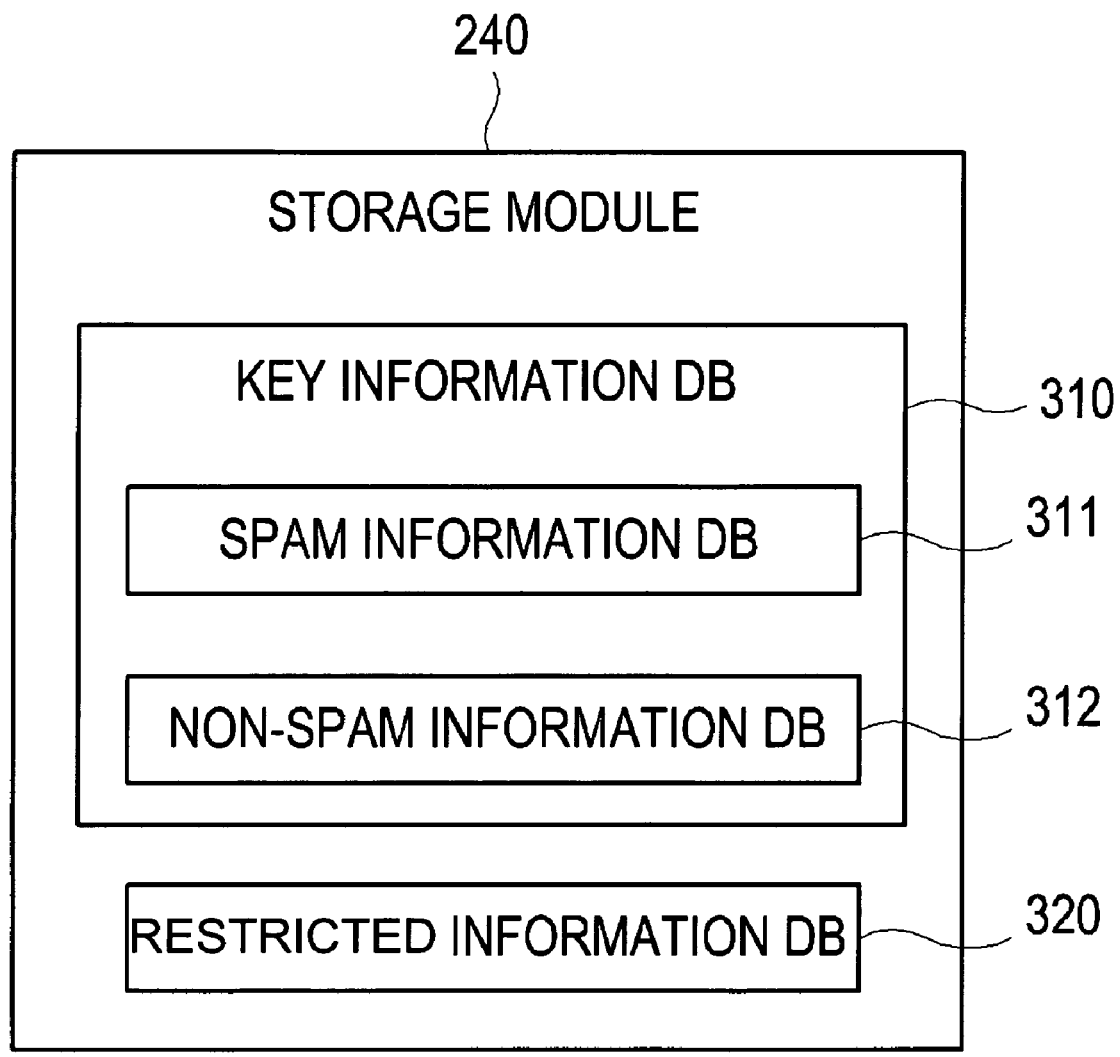
FIG. 3 illustrates a detailed block diagram of a storage part of the spam detection server according to one embodiment of the present invention.

FIG. 3 illustrates a detailed block diagram of a storage module of the spam detection server according to one embodiment of the present invention. Referring to FIG. 3, the storage module 240 of the spam detection server 131 comprises at least one key information DB 310 for storing key information and classification algorithm data corresponding thereto and at least one restricted information DB 320 for storing predetermined restricted information.

In one embodiment, the key information DB 310 may include a spam information DB 311 for storing key information classified as spam key information and a regular information DB 312 for storing key information classified as regular key information. The key information in key information DB may be either classified as spam or non-spam depending on their spam score, which is a classification algorithm data for exact matching algorithm.

The spam score is an index for indicating the likelihood the UCC including the associated key information are spam UCC, for each of the key information stored therein. The key information with a spam score equal to or higher than a predetermined threshold value is classified as spam key information. In one embodiment, the spam score may be determined based on the number of times the corresponding key information is found in the UCC of a training data pool classified as spam UCC. For example, if, among the training data, the word "poker" is found in 50 of 100 spam UCC whereas the word "bridge" is found in only 1 of 100 spam UCC, then the word "poker" will be given a higher spam score than the word "bridge." In another embodiment, the ratio of the numbers of times the corresponding key information is found in the training data classified as spam UCC and non-spam UCC can be used to determine the spam score. For example, if, among the training data, the word "poker" is found in 50 of 100 spam UCC and 10 of 100 non-spam UCC, whereas the word "bridge" is found in 1 of 100 spam UCC and 40 of non-spam UCC, then the word "poker" will be given a higher spam score than the word "bridge." In other embodiments, a combination of the above and other various factors may be employed in determining the spam score for each of the key information in the key information DB.

Further, the key information DB may include, for each of the key information stored therein, the spam probability data, which is classification algorithm data for naïve-Bayes classifier algorithm. The spam probability data is an estimate of the probability the associated key information is found in spam UCC. In one embodiment, the spam probability data may be derived from the training data pool. For example, the spam probability may be defined as a function of the probabilities certain key information can be found in spam and non-spam UCC of the training data pool. In particular, if the word "poker" is found in 20% of spam UCC (e.g., 10 of 50 spam UCC) in the training data pool and 1% of non-spam UCC (e.g., 1 of 100 non-spam UCC) in the training data pool, then the spam probability may be calculated as 20%/(20%+1%) =95.2%. The spam probability data may be updated as new UCC are received and classified by the control module 250.

The restricted information DB 320 includes the predetermined restricted data types and/or data such as residential numbers and sexually explicit words. These restricted data types and/or data may be selected and inputted by the portal site operator.

Although only one key information DB 310 and one restricted information DB 320 are illustrated in FIG. 3 for ease of explanation, it should be noted that two or more key information DBs and restricted information DBs may be stored in the storage module 240 of the portal site system 130. Each of the above DBs may contain information directed toward a specific UCC service and/or a specific content category. For example, a key information DB for the content category regarding news items on politics may contain key information related to politics.

Figure 4:
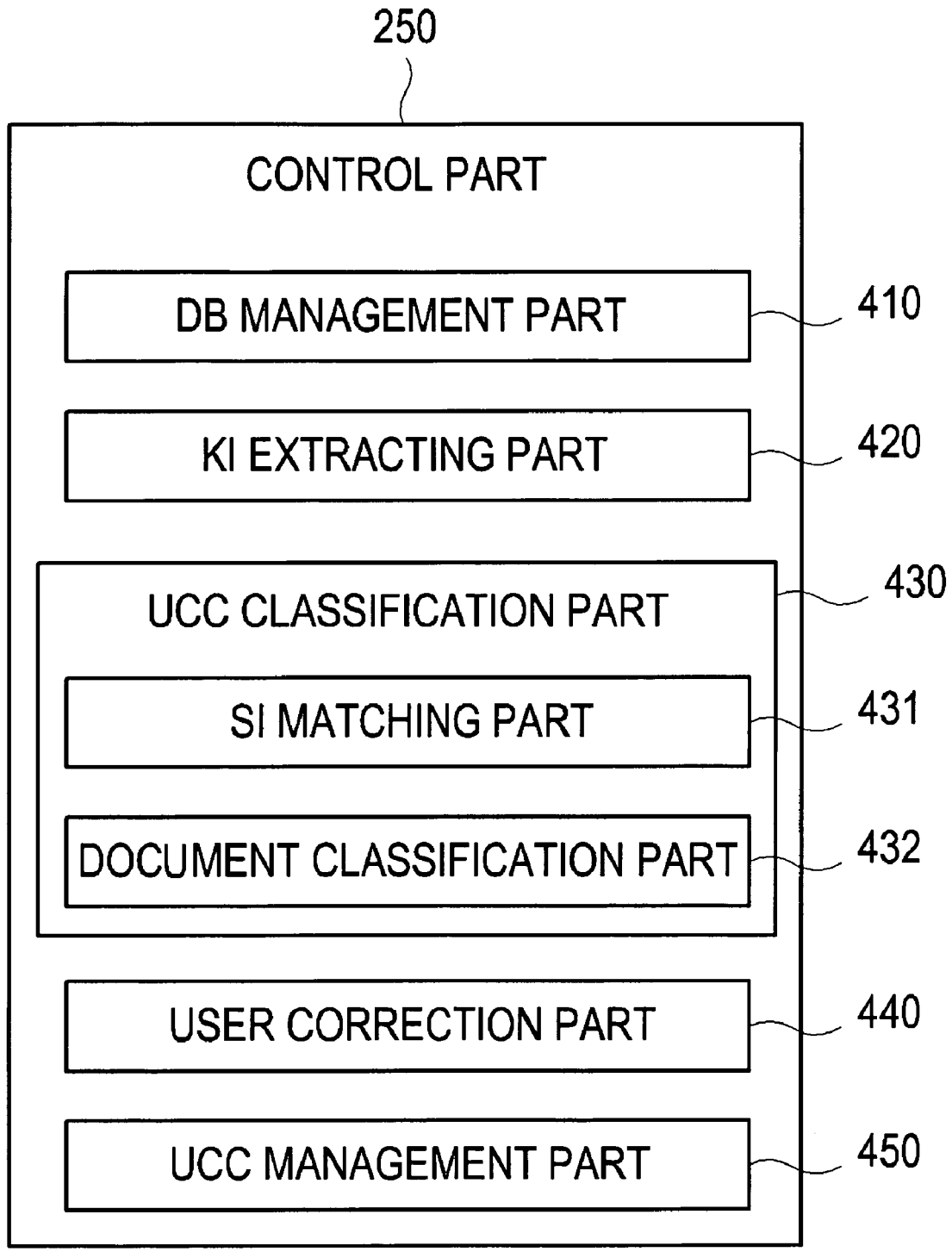
FIG. 4 illustrates a detailed block diagram of a control part of the spam detection server according to one embodiment of the present invention.

FIG. 4 illustrates a detailed block diagram of a control module of the spam detection server according to one embodiment of the present invention. Referring to FIG. 4, the control module 250 of spam detection server 131 comprises: a DB management part 410 for managing the key information DB 310 and the restricted information DB 320; a key information extracting part 420 for extracting key information from UCC received from the communication module 210; and a UCC classification part 430 for classifying the received UCC based on the extracted key information and the relevant information in the key information DB 310. The control module 250 may further comprise: a user correction part 440 for inputting/updating data for DBs 310 and 320 and reclassifying the UCC classified by the UCC classification part 430 in accordance with key inputs by the portal site operator; and a UCC management part 450 for processing the received UCC in accordance with the classification of the received UCC.

The DB management part 410 may prepare and manage the key information DB 310 and the restricted information DB 320 in cooperation with the other parts including the key information extracting part 420 and the UCC classification part 430. In particular, the DB management part 410 may prepare and store key information DB 310 in the storage part 240 based on a pool of training data, which may be inputted from the portal site operator. The training data may include a plurality of key information and classification algorithm data for each of the key information. Further, the DB management part 410 may update the key information item (i.e., key information and its relevant classification algorithm data) in the key information database 310 after the key information extracting part 420 extracts key information from the received UCC and the UCC classification part 430 classifies the received UCC based on the extracted key information. That is, the newly received UCC may be used by the DB management part 410 as new training data to update the key information DB 310 after it has been classified as spam or non-spam by the UCC classification part 420. Also, the DB management part 410 may prepare, store and update the restricted information DB 320 based on the restricted information, which may be inputted from the portal site operator.

The key information extracting part 420 extracts predetermined types of key information from the received UCC using a predetermined extraction algorithm. In one embodiment, the key information extraction part 420 may extract structured key information, such as URL, site address, account number, telephone number and/or resident number, included in the received UCC using predefined regular expressions for each type of the key information. The regular expression is a string (i.e., ordered sequence of symbols) that is used to match a set of strings according to certain syntax rules. For example, a regular expression adapted to search and extract a Korean resident number, which is a 13 digit number generated according to a predefined syntax rule, may be used to search and extract the Korean resident numbers from the received UCC. The regular expression is commonly used to search and manipulate the bodies of text in a content based on certain patterns and an embodiment further explanation thereon may be omitted without imposing any difficulty in implementing the present invention. Further, the key information extracting part 420 may extract words or phrases from the received UCC by using conventional word/phrase extracting algorithms or language analyzing algorithms. A variety of word/phrase extracting algorithms and language analyzing algorithms are available for use and those skilled in the art would have no difficulty in selecting and applying appropriate algorithms in implementing an embodiment of the present invention.

In addition to extracting key information from the received UCC, the key information extracting part 420 may perform preprocessing to the received UCC prior to extracting key information therefrom to effectively perform the aforementioned extraction operation. In one embodiment, the key information extracting part 420 may remove words determined as irrelevant in classifying the UCC. For example, words and/or phrases that generally appear in both spam and non-spam UCC, such as "news," "hello" and "hi," may be removed from the received UCC before the key information extraction process is performed thereon. In another example, key information that does not have any statistical significance may be deleted. The key information must appear in more than a predetermined number of UCC classified as spam or non-spam to effectively function as an indicator in classifying the UCC containing the key information. The key information that is found in less than the predetermined number of UCC in the training data pool may be deleted prior to classification of the received UCC. The key information extracting part 420 of another embodiment may include a morpheme analyzer (not shown) to perform natural language processing, such as text segmentation and morpheme analysis. For example, the key information extracting part 420 may transform the words in the received UCC to their canonical forms or lemmas (e.g., {goes, going, went}→go, mice→mouse). Various preprocessing scheme may be employed in accordance with the classification algorithm used by the UCC classification part 430 to effectively extract key information from the received UCC.

The UCC classification part 430 may classify the received UCC as spam or non-spam based on the key information extracted therefrom by the key information extraction part 420. In classifying the received UCC, the UCC classification part 430 may use one or more classification algorithms, such as exact matching algorithms, document classification algorithms and/or any other appropriate algorithm. Upon receiving the extracted key information, the UCC classification part 430 may retrieve information based on the extracted key information from the key information database (e.g., the key information relevant to the extracted key information and its spam probability and/or spam score) to perform the classification algorithm(s). In one embodiment, the UCC classification module 430 may choose from a plurality of key information DBs in the storage module 240 one or more key information DBs to be used by the classification algorithm(s) based on the service ID and/or the content category ID of the received UCC.

The exact matching algorithm searches the key information DB for the spam information that is identical and/or substantially identical to the one extracted from the received UCC. In one embodiment, the received UCC is classified as spam, if an exact match is found in the key information DB. In another embodiment, the received UCC is classified as spam, if an exact match and/or its equivalent(s)/variant(s) are found in the key information DB. For example, variants of a URL www.poker.com may include poker888.com, ww.poker888.com, www.POKER888.com (capital letters), http://www.poker88.com, www.poker888.com and www.poker888.@om.

The document classification algorithm is an algorithm that assigns an electronic document (e.g., UCC) to one or more categories (e.g., spam or non-spam) based on its contents. Examples of the document classification algorithm include naive-Bayes classifier, term frequency-inverse document frequency (tf-idf), latent semantic indexing, support vector machines, artificial neural network, k-nearest neighbor algorithm (kNN), decision trees (e.g. ID3) and concept mining. When the naïve-Bayes classifier algorithm is used, the UCC classification part 430 may classify the received UCC by calculating the total spam probability using the spam probability data of all the extracted key information and determining whether the total spam probability exceeds a predetermined threshold value. For example, if the received UCC contains the word "poker" with spam probability of 95.2% and the word "black jack" with spam probability of 66.6%, then the total spam probability is calculated as (95.2%*66.6%)/[95.2%*66.6%+(100%-95.2%)*(100%-66.6%]. Here, the sign "*" denotes multiplication. The naïve-Bayes classifier algorithm is well known in the art and no further description thereon should be needed.

The classification algorithms may be selected based on various factors, such as computational capacity of spam detection server 131 and the accuracy of the classification results. In one embodiment, the UCC classification part 430 may classify the received UCC as spam when at least one of the classification algorithms classifies the received UCC as spam. In another embodiment, the UCC classification part 430 may classify the received UCC as spam only when all of the classification algorithms classify the received UCC as spam. In yet other embodiments, the UCC classification part 430 may compute the total score based on the classification results of all the classification algorithms and classify the received UCC based on the total score.

The user correction part 440 may display the received UCC and its classification result through the display module 230 to the portal site operator and reclassify the classification result based on the key input by the portal site operator. This provides a chance to correct the classification result by the UCC classification part 430 by the portal site operator, thereby enhancing the reliability of the spam detection server 131.

The UCC management part 450 may check whether the received UCC is classified as spam or whether the received UCC contains any predetermined restricted contents, which may be stored in the storage module 240. In one embodiment, if the received UCC contains any predetermined restricted contents, then the UCC management part 450 may delete the restricted content from the UCC or replace it with predetermined content. In another embodiment, instead of deleting restricted information, the UCC management part 450 may delete the received UCC. Further, the UCC management part 450 may notify the user terminal 121, 122 or 123 that transmitted the received UCC of the classification result. The notification may contain a warning message.

Figure 5:
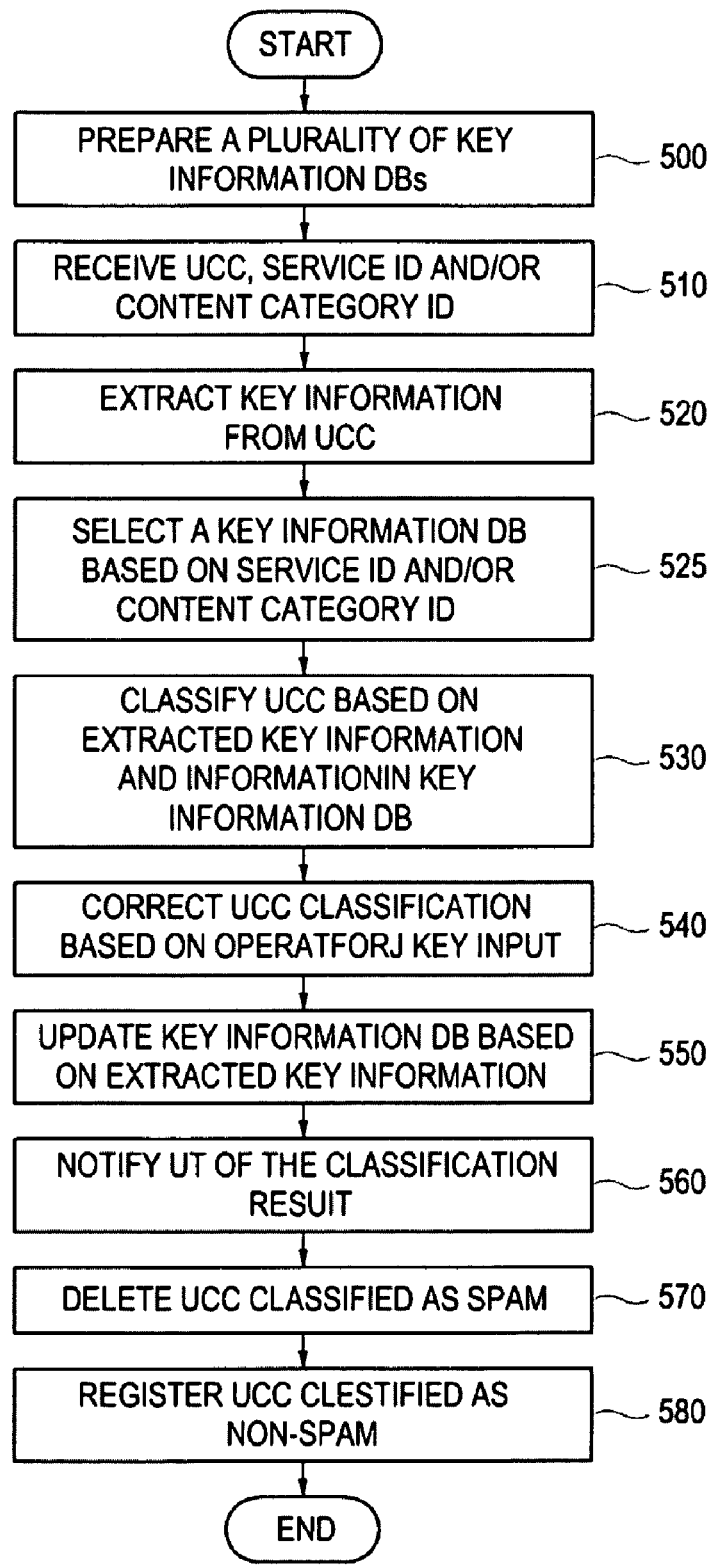
FIG. 5 illustrates a flow chart for detecting spam UCC according to one embodiment of the present invention.

FIG. 5 illustrates a flow chart for detecting spam UCC according to one embodiment of the present invention. Referring to FIG. 5, the DB management part 410 of the spam detection server 131 prepares and stores in the storage module 240 a plurality of key information DBs, each of which includes a plurality of key information and classification algorithm data for the key information (operation 500). In operation 510, the key information extraction part 420 receives UCC and at least one of the service ID or the content category ID for the UCC from one of the user terminals 121, 122 and 123 and extracts key information from the received UCC (operation 520). In operation 525, the UCC classification part 430 selects one of the stored key information DBs based on at least one of the service ID and the content category ID. In operation 530, the UCC classification part 430 classifies the received UCC as spam or non-spam based on the extracted key information and the information in the selected key information DB (for example, key information DB 310), which are relevant to the extracted key information. The classified UCC may be shown through the display module 230 to a portal site operator with the classification result. This is so that the portal site operator may confirm whether the received UCC have been classified correctly. The user correction part 440 may reclassify the classified UCC based on the key input from the portal site operator (operation 540). In operation 550, DB management part 410 may update the key information DB 310 based on the extracted key information and the classification of the received UCC and UCC management. Further, the UCC management part 450 may notify the user terminal that sent the UCC of the classification result (operation 560). The notification may contain a warning message notifying the user that the UCC contains spam information. Then, the UCC management part 450 may delete the UCC classified as spam (operation 570), register the UCC classified as non-spam by sending the non-spam UCC to repository server 132 (operation 580) and abort the process.

Although not illustrated in FIG. 5, upon extracting the key information, the UCC classification part 430 may check whether the extracted key information corresponds to the restricted information in the restricted information DB 320. In one embodiment, if the extracted information corresponds to the restricted information, then the UCC management part 450 may delete the restricted information from the UCC. Further, the UCC management part 450 may register the modified UCC classified as non-spam by sending the non-spam UCC to the repository server 132. In another embodiment, instead of deleting restricted information, the UCC management part 450 may delete the received UCC.

Figure 6:
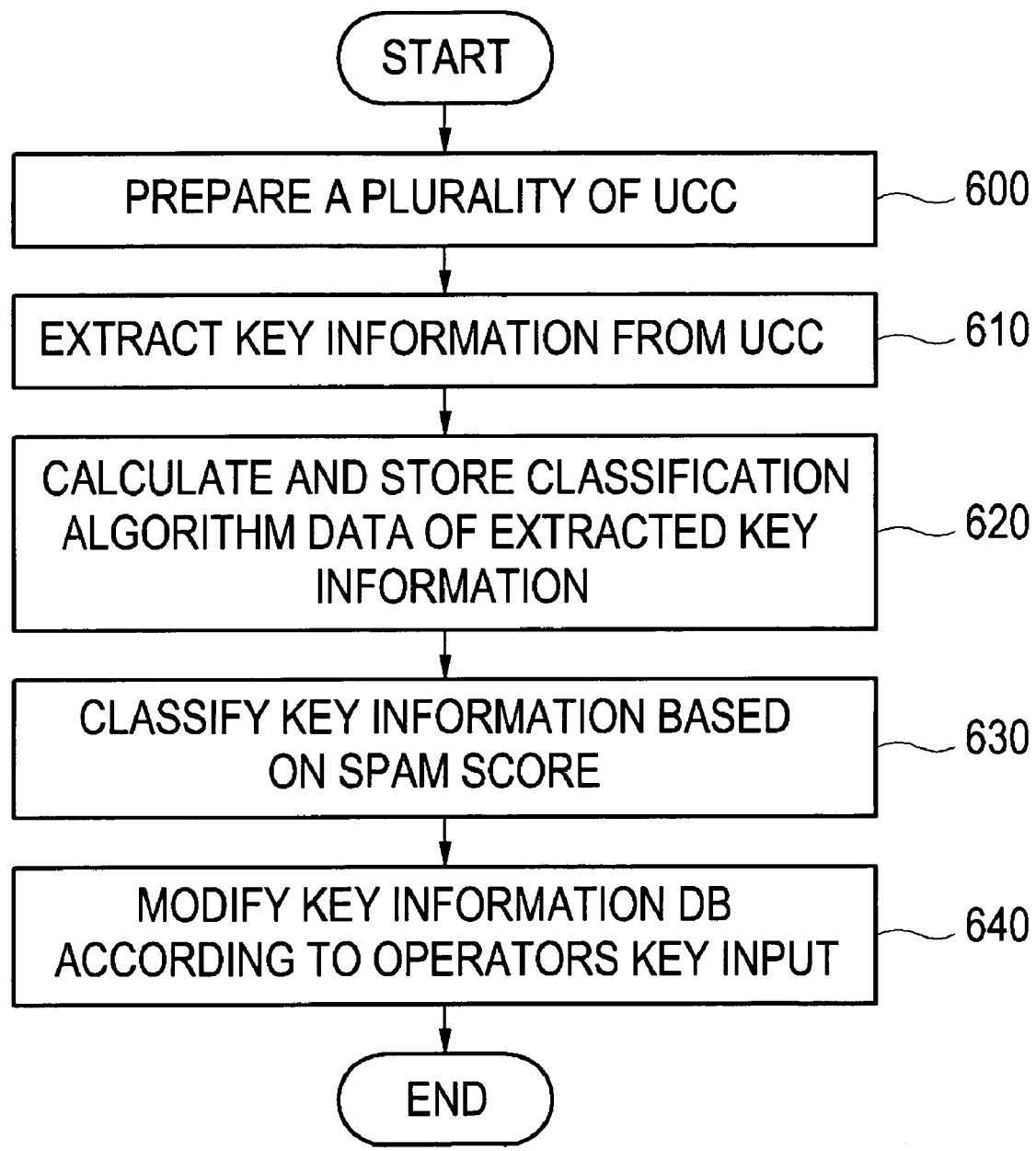
FIG. 6 illustrates a flow chart showing the process of preparing key information DB according to one embodiment of the present invention.

FIG. 6 illustrates a flow chart for preparing the key information DB according to one embodiment of the present invention. Referring to FIG. 6, a plurality of UCC are prepared (operation 600) and the key information extraction part 420 extracts key information from the plurality of UCC (operation 610). In operation 620, the DB management part 410 calculates and stores classification algorithm data, such as the frequency of occurrence, spam score and/or spam probability, of the extracted key information. Then, the DB management part 410 may classify the extracted key information as standard or spam key information based on the classification algorithm data, such as the spam score (operation 630). Further, the DB management part 410 may modify or update the key information DB 310 according to the key input by the portal site operator (operation 640) and abort the process. For example, the portal site operator may manually input or update new key information and/or its classification algorithm data.

Figure 7:
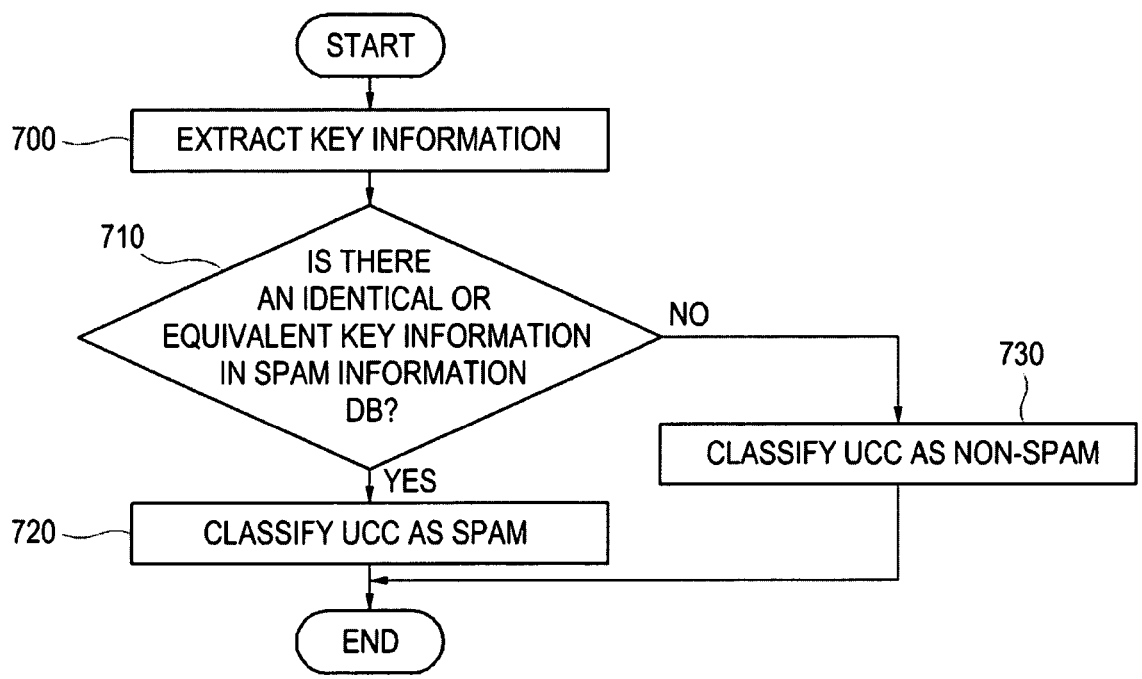
FIG. 7 illustrates a flow chart showing the process of classifying UCC using the exact matching algorithm according to one embodiment of the present invention.

FIG. 7 illustrates a flow chart for classifying UCC using the exact matching algorithm according to one embodiment of the present invention. Referring to FIG. 7, the UCC classification part 430 receives key information of UCC from the key information extraction part 420 (operation 700). In operation 710, the UCC classification part 430 determines whether identical or equivalent key information is in the spam information DB 311. If the identical or equivalent key information is in the spam information DB 311, then the UCC classification part 430 classifies the UCC as spam (operation 720) and aborts the process. On the other hand, if the identical or equivalent key information is not found in the spam information DB 311, then the UCC classification part 430 classifies the UCC as non-spam (operation 730) and ends the process.

Figure 8:
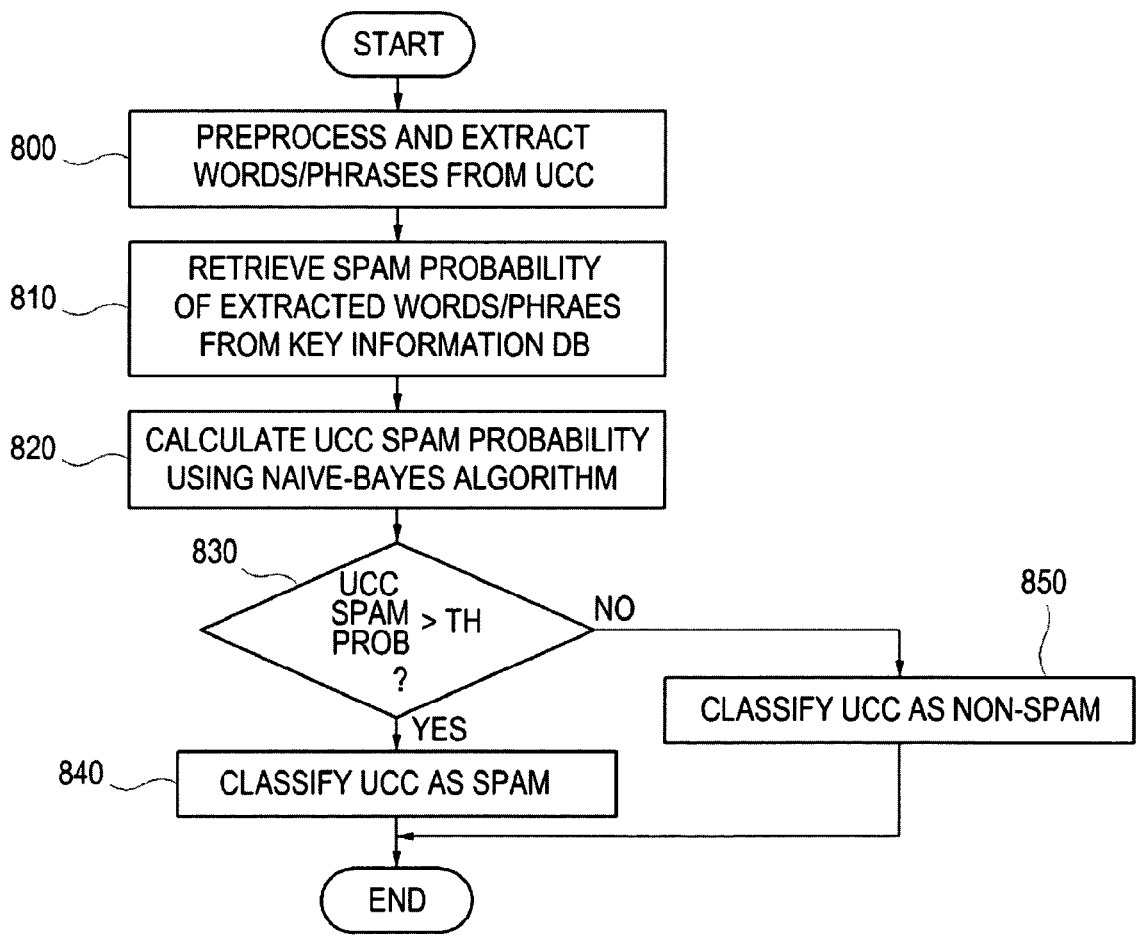
FIG. 8 illustrates a flow chart showing the process of classifying UCC using the naïve-Bayes classifier algorithm according to one embodiment of the present invention.

FIG. 8 illustrates a flow chart classifying UCC using the naïve-Bayes classifier algorithm according to one embodiment of the present invention. Referring to FIG. 8, the UCC classification part 430 receives word(s) and/or phrase(s) of UCC from the key information extraction part 420 (operation 800). In operation 810, the UCC classification part 430 retrieves spam probabilities of each of the received word(s) and/or phrase(s) from the key information DB 310 and calculates the spam probability of the UCC according to naïve-Bayes classifier algorithm based on the retrieved spam probabilities (operation 820). In operation 830, the UCC classification part 430 determines whether the calculated UCC spam probability is greater than a predetermined threshold value (TH). If the UCC spam probability is greater than the TH, then the UCC classification part 430 classifies the UCC as spam (operation 840) and aborts the process. On the other hand, if the UCC spam probability is equal to or smaller than the TH, then the UCC classification part 430 classifies the UCC as non-spam (operation 850) and aborts the process.

Figure 9:
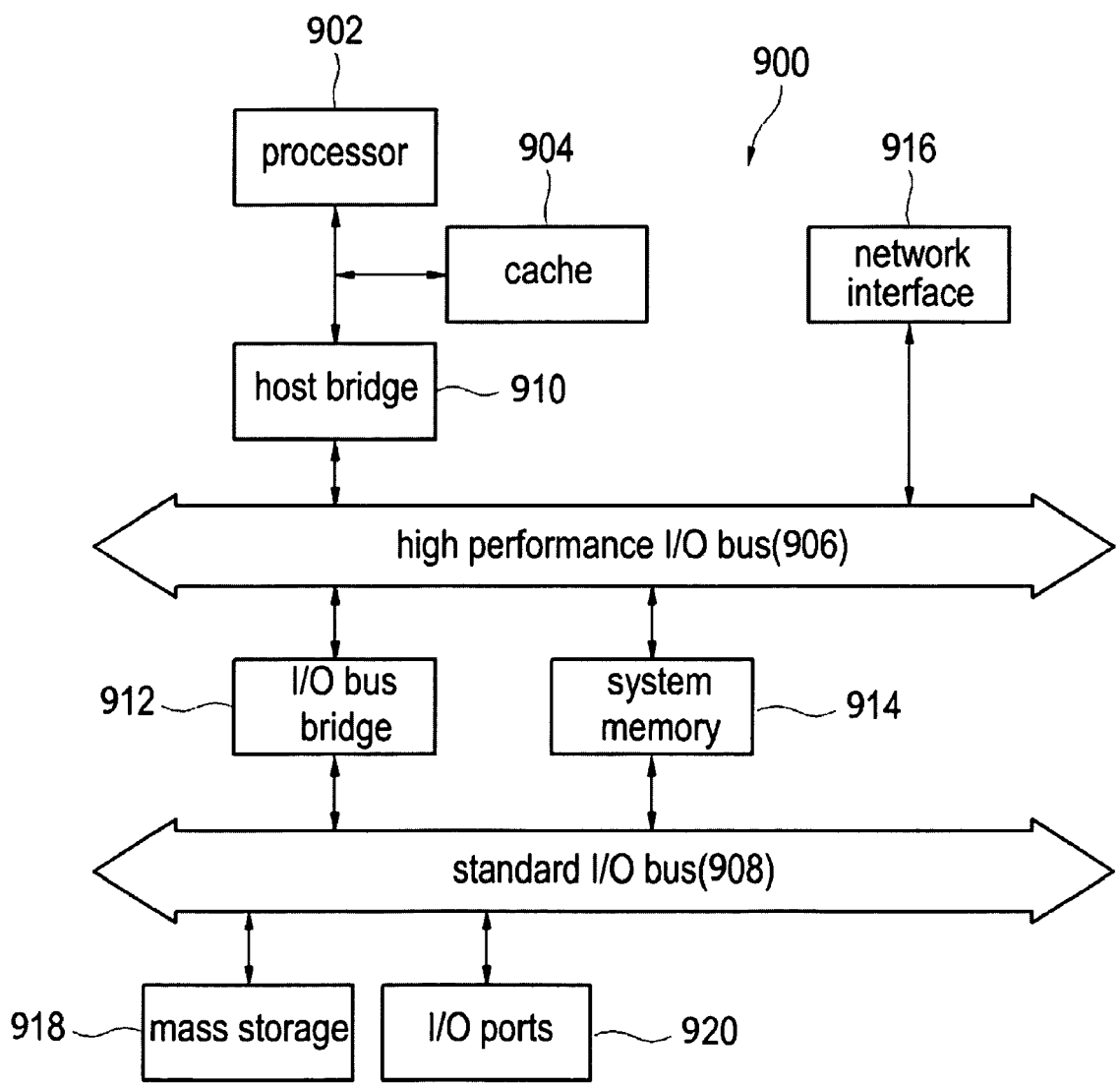
FIG. 9 illustrates an example computing system architecture that may be used to implement embodiments of the present invention.

While the methods and systems of the present invention have been described above with reference to specific embodiments, some or all of the elements or operations thereof may be implemented using a computer system having a general purpose hardware architecture. FIG. 9 illustrates an example computing system architecture, which may be used to implement the above described embodiments, which may be used to perform one or more of the processes or elements described herein. In one implementation, hardware system 900 includes a processor 902, a cache memory 904 and one or more software applications and drivers directed to the functions described herein.

Additionally, the hardware system 900 includes a high performance input/output (I/O) bus 906 and a standard I/O bus 908. A host bridge 910 couples the processor 902 to the high performance I/O bus 906, whereas the I/O bus bridge 912 couples the two buses 906 and 908 to each other. A system memory 914 and a network/communication interface 916 couple to the bus 906. The hardware system 900 may further include video memory (not shown) and a display device coupled to the video memory. The mass storage 918 and I/O ports 920 are coupled to the bus 908. The hardware system 900 may optionally include a keyboard and pointing device. Further, it may include a display device (not shown) coupled to the bus 908. Collectively, these elements are intended to represent a broad category of computer hardware systems including, but not limited to, general purpose computer systems based on the Pentium® processor manufactured by Intel Corporation of Santa Clara, Calif., as well as any other suitable processor.

The elements of the hardware system 900 are described in greater detail below. In particular, the network interface 916 provides communication between the hardware system 900 and any of a wide range of networks, such as an Ethernet (e.g., IEEE 802.3) network, etc. In the case of the spam detection server 131 (FIGS. 1 and 2), the network interface 916 interfaces between the hardware system 900 and the network connected to the user terminals 121, 122 and 123 for allowing the hardware system 900 to communicate with those terminals. Similarly, in the case of the user terminals 121, 122 and 123 (FIG. 1), the network interface 916 interfaces between the hardware system 900 and the network connected to the spam detection server 131 for allowing the hardware system 900 to communicate with those servers. The mass storage 918 provides permanent storage for the data and programming instructions to perform the above-described functions implemented in the user terminals 121, 122 and 123 or the spam detection server 131, whereas the system memory 914 (e.g., DRAM) provides temporary storage for the data and programming instructions when executed by the processor 502. The I/O ports 920 are one or more serial and/or parallel communication ports that provide communication between additional peripheral devices, which may be coupled to the hardware system 900.

The hardware system 900 may include a variety of system architectures. Further, various components of the hardware system 900 may be rearranged. For example, a cache 904 may be on-chip with the processor 902. Alternatively, the cache 904 and the processor 902 may be packed together as a "processor module," with the processor 902 being referred to as the "processor core." Furthermore, certain implementations of the present invention may not require nor include all of the above components. For example, the peripheral devices shown coupled to the standard I/O bus 908 may couple to the high performance I/O bus 906. In addition, in some implementations, only a single bus may exist, with the components of the hardware system 900 being coupled to the single bus. Furthermore, the hardware system 900 may include additional components, such as additional processors, storage devices or memories. As discussed below, in one embodiment, the operations of the portal site system including the portal site system 130 described herein are implemented as a series of software routines run by the hardware system 900. These software routines comprise a plurality or series of instructions to be executed by a processor in a hardware system such as the processor 902. Initially, the series of instructions are stored on a storage device such as the mass storage 918. However, the series of instructions can be stored on any suitable storage medium, such as a diskette, CD-ROM, ROM, EEPROM, etc. Furthermore, the series of instructions need not be stored locally and could be received from a remote storage device, such as a server on a network, via network/communication interface 916. The instructions are copied from the storage device, such as the mass storage 918, into the memory 914 and then accessed and executed by the processor 902.

An operating system manages and controls the operation of the hardware system 900, including the input and output of data to and from software applications (not shown). The operating system provides an interface between the software applications being executed on the system and the hardware components of the system. According to one embodiment of the present invention, the operating system is the Windows® 95/98/NT/XP operating system, which is available from Microsoft Corporation of Redmond, Wash. However, the present invention may be used with other suitable operating systems, such as the Apple Macintosh Operating System, which is available from Apple Computer Inc. of Cupertino, Calif., UNIX operating systems, LINUX operating systems and the like.

Advantageously, certain embodiments of the present invention provide a method and apparatus for automatically detecting spam UCC prior to their registration on a portal site server may be provided. Additionally, while the present invention has been shown and described with respect to a preferred embodiment, those skilled in the art will recognize that various changes and modifications may be made without departing from the spirit and scope of the invention as defined in the appended claims.

What is claimed is:

1. A method for processing spam contents, comprising the steps of:
   maintaining a plurality of key information databases;
   receiving user-created content and at least one of a service identifier (ID) and a content category ID of said user-created content from one or more users of a user-created content hosting site;
   selecting at least one of the plurality of key information databases based on at least one of the received service ID and the received content category ID;
   extracting second key information from the received user-created content;
   searching the selected key information database to retrieve first key information related to the second key information;
   classifying the user-created content as spam content based on the extracted second key information and/or the retrieved first key information related to the second key information; and
   conditionally storing the user-created content in a network accessible data store available to users of the user-created content hosting site based on classifying the user-created content as spam or non-spam content
   wherein,
   the second key information is different from the service ID, and
   the second key information is different from the content category ID.

2. The method of claim 1, wherein said first and second key information comprise at least one of predetermined type(s) of data, word(s) and phrase(s) in said contents, and wherein said data comprises at least one of a user ID, a universal resource locator, a site address, an account number or a telephone number.

3. The method of claim 2, wherein said maintaining comprises maintaining a spam information database, and wherein said classifying comprises classifying said user-created content as spam content based on whether the spam information database includes the extracted second key information.

4. The method of claim 3, wherein said maintaining a spam information database comprises:
preparing a series of user-created contents, each of said contents classified as spam or non-spam content;
obtaining, from the series of user-created contents, third key information and the frequency the third key information is found in the contents classified as spam content; and
recording the third key information in the spam information database based on the obtained frequency.

5. The method of claim 1, wherein said classifying comprises classifying said user-created content as spam content using a document classification algorithm.

6. The method of claim 5, wherein said classifying comprises:
obtaining spam probability data for the extracted second key information from the key information database; and
classifying the user-created content as spam content based on the obtained spam probability data.

7. The method of claim 6, wherein said updating comprises updating the spam probability data for the extracted second key information in accordance with the extracted second key information.

8. The method of claim 1, further comprising:
updating the key information database based on the extracted second key information.

9. The method of claim 8, wherein said updating comprises registering the extracted second key information as the first key information in the key information database.

10. The method of claim 8, wherein said updating comprises updating the frequency the extracted second key information is found in spam contents in accordance with the extracted second key information.

11. The method of claim 1, further comprising:
determining whether the extracted second key information corresponds to predefined restricted information; and if the extracted key second information corresponds to the predefined restricted information, removing the extracted second key information or replacing the extracted second key information with predefined different information.

12. Logic encoded in one or more tangible media for execution and when executed operable to cause the one or more processors to:
maintain a plurality of key information databases;
receive user-created content at least one of a service identifier (ID) and a content category ID of said user-created content from one or more users of a user-created content hosting site;
select at least one of the plurality of key information databases based on at least one of the received service ID and the received content category ID;
extract second key information from the received user-created content;
search the selected key information database to retrieve first key information related to the second key information;
classify the user-created content as spam content based on the extracted second key information and/or the retrieved first key information related to the second key information; and
conditionally store the user-created content in a network accessible data store available to users of the user-created content hosting site based on classifying the user-created content as spam or non-spam content wherein,
the second key information is different from the service ID, and
the second key information is different from the content category ID.

13. An apparatus for processing spam contents, said apparatus comprising:
a non-transitory computer-readable medium configured to include a plurality of key information databases;
a communication part configured to receive user-created content and at least one of a service ID and a content category ID from one or more of users of a user-created content hosting site; and
a control part configured to select one of the plurality of key information databases based on at least one of the service ID and the content category ID, extract second key information from the received user-created content, search the selected key information database to retrieve first key information related to the extracted second key information, classify the received user-created content as spam content based on the extracted second key information and/or the retrieved first key information related to the first key information, and conditionally store the user-created content in a network accessible data store available to users of the user-created content hosting site based on classifying the user-created content as spam or non-spam content
wherein,
the second key information is different from the service ID, and
the second key information is different from the content category ID.

14. The apparatus of claim 13, wherein said first and second key information comprise at least one of predetermined types of data, a word and a phrase of said contents, said data comprising at least one of a user ID, a URL (Universal Resource Locator), a site address, an account number and a telephone number.

15. The apparatus of claim 13, wherein said control part comprises:
a key information management part configured to prepare a spam information database by classifying at least some of key information of the first information as spam key information; and
a spam information matching part configured to classify said contents as spam contents based on whether the spam information database includes the extracted second key information.

16. The apparatus of claim 15, wherein said key information management part prepares a series of user-created contents, each of said user-created content classified as spam or non-spam content; obtains, from the series of user-created contents, third key information and the frequency the third key information is found in the user-created content classified as spam content; and records the third key information in the spam information database based on the obtained frequency.

17. The apparatus of claim 13, wherein said control part comprises a document classifying part configured to classify said user-created content as spam content using a document classification algorithm.

18. The apparatus of claim 17, wherein said document classifying part obtains spam probability data for the extracted second key information from the key information database and classifies the user-created content as spam content based on the obtained spam probability data.

19. The apparatus of claim 13, wherein said control part comprises a key information management part configured to update the key information database based on the extracted second key information.

20. The apparatus of claim 19, wherein said key information management part registers the extracted second key information as the first key information in the key information database.

21. The apparatus of claim 19, wherein said key information management part updates the frequency the extracted second key information is found in spam content in accordance with the extracted second key information.

22. The apparatus of claim 19, wherein said key information management part updates the spam probability data for the extracted second key information in accordance with the extracted second key information.

23. The apparatus of claim 13, wherein said control part further comprises:
   a contents management part configured to determine whether the extracted second key information corresponds to predefined restricted information and, if the extracted second key information corresponds to the predefined restricted information, removes the extracted second key information or replaces the extracted second key information with predefined different information.

24. A method for processing spam contents, comprising the steps of:
   maintaining a plurality of key information databases;
   receiving user-created content and at least one of a service ID and a content category ID of the user-created content from one or more users of a user-created content hosting site;
   selecting one of the plurality of key information databases based on at least one of the service ID and the content category ID;
   extracting second key information from the received user-created content;
   searching the selected key information database to retrieve first key information matching the second key information;
   if a match is found, classifying the user-created content as spam content; and
   conditionally storing the user-created content in a network accessible data store available to users of the user-created content hosting site based on classifying the user-created content as spam or non-spam content
   wherein,
      the second key information is different from the service ID, and
      the second key information is different from the content category ID.

25. An apparatus for processing spam contents, said apparatus comprising:
   a non-transitory computer-readable medium configured to include a key information database;
   a communication part configured to receive user-created content and at least one of a service ID and a content category ID of the user-created content from one or more users of a user-created content hosting site; and
   a control part configured to select one of the plurality of key information databases based on at least one of the service ID and the content category ID, extract second key information from the received user-created content, search the selected key information database to retrieve first key information matching the second key information, if a match is found, classify the user-created content as spam content and conditionally store the user-created content in a network accessible data store available to users of the user-created content hosting site based on classifying the user-created content as spam or non-spam content
   wherein,
      the second key information is different from the service ID, and
      the second key information is different from the content category ID.

* * * * *